United States Patent
Doi et al.

(10) Patent No.: US 9,053,736 B2
(45) Date of Patent: Jun. 9, 2015

(54) METHOD FOR MANUFACTURING AN ALUMINOSILICATE GLASS SUBSTRATE FOR HARD DISKS

(75) Inventors: Haruhiko Doi, Wakayama (JP); Yosuke Uchino, Wakayama (JP); Kazuhiko Nishimoto, Wakayama (JP)

(73) Assignee: Kao Corporation, Tokyo (JP)

( * ) Notice: Subject to any disclaimer, the term of this patent is extended or adjusted under 35 U.S.C. 154(b) by 225 days.

(21) Appl. No.: 13/642,410

(22) PCT Filed: Apr. 19, 2011

(86) PCT No.: PCT/JP2011/059605
§ 371 (c)(1),
(2), (4) Date: Oct. 19, 2012

(87) PCT Pub. No.: WO2011/132665
PCT Pub. Date: Oct. 27, 2011

(65) Prior Publication Data
US 2013/0032571 A1  Feb. 7, 2013

(30) Foreign Application Priority Data

Apr. 20, 2010 (JP) ................................. 2010-096972

(51) Int. Cl.
*C03C 15/02* (2006.01)
*G11B 5/84* (2006.01)
*C09K 3/14* (2006.01)

(52) U.S. Cl.
CPC ............ *G11B 5/8404* (2013.01); *C09K 3/1463* (2013.01)

(58) Field of Classification Search
CPC ............................ G11B 5/8404; C09K 3/1463
USPC ...................................................... 216/38, 97
See application file for complete search history.

(56) References Cited

U.S. PATENT DOCUMENTS

| 7,279,119 | B2 | 10/2007 | Hellring et al. |
| 2007/0145014 | A1 | 6/2007 | Nishimoto et al. |
| 2008/0006057 | A1 | 1/2008 | Nishimoto et al. |
| 2009/0239450 | A1 | 9/2009 | Ishida et al. |
| 2010/0056026 | A1 | 3/2010 | Shirota et al. |

FOREIGN PATENT DOCUMENTS

| GB | 2421955 A | 7/2006 | |
| JP | 2006-167817 A | 6/2006 | |
| JP | 2006-193695 A | * 7/2006 | ............... C09K 3/14 |
| JP | 20060727 | * 7/2006 | ............... C09K 3/14 |
| JP | 2007-191696 A | 8/2007 | |
| JP | 2008-13655 A | 1/2008 | |
| JP | 2009-50920 A | 3/2009 | |
| WO | WO 2008/081943 A1 | 7/2008 | |

OTHER PUBLICATIONS

The First Office Action (including an English translation), dated Jun. 10, 2014, issued in the corresponding Chinese Patent Application No. 201180019525.4.
PCT/ISA/210—International Search Report mailed on Aug. 2, 2011, issued in PCT/JP2011/059605.

* cited by examiner

*Primary Examiner* — Nadine Norton
*Assistant Examiner* — Mahmoud Dahimene
(74) *Attorney, Agent, or Firm* — Birch, Stewart, Kolasch & Birch, LLP

(57) ABSTRACT

A method for manufacturing an aluminosilicate glass substrate for a hard disk of the present invention includes polishing an aluminosilicate glass substrate to be polished with a polishing composition that includes silica particles, a polymer having a sulfonic acid group, and water, wherein an adsorption constant of the polymer having the sulfonic acid group on aluminosilicate glass is 1.5 to 5.0 L/g. The polymer having the sulfonic acid group is preferably a polymer having an aromatic ring. The weight average molecular weight of the polymer having the sulfonic acid group is 3000 to 100000.

13 Claims, No Drawings

METHOD FOR MANUFACTURING AN ALUMINOSILICATE GLASS SUBSTRATE FOR HARD DISKS

TECHNICAL FIELD

The present invention relates to a method for manufacturing an aluminosilicate glass substrate for a hard disk, and a method for reducing surface waviness of an aluminosilicate glass substrate for a hard disk.

BACKGROUND ART

In recent years, a magnetic disk drive has become increasingly smaller in size and larger in capacity and is required to achieve higher recording density. To increase the recording density, the unit recording area should be reduced while the detection sensitivity of a weak magnetic signal should be improved. For this purpose, technological development for further lowering the flying height of a magnetic head has advanced. In such a case, if the surface roughness of a substrate is large, the magnetic head can collide with a disk surface during reading and writing operations. Therefore, more excellent surface quality of a glass substrate is necessary to increase the recording density even further. Thus, particles containing silicon dioxide (also referred to as "silica particles" in the following) have been used as an abrasive for a final (finish) polishing liquid. Recently, as a polishing composition capable of reducing the surface roughness of the glass substrate and achieving a high polishing rate, an acidic polishing composition for a glass substrate has been proposed that includes silica particles having a small particle size and an acrylic acid/sulfonic acid copolymer having a weight average molecular weight within a predetermined range (Patent Document 1).

On the other hand, a polishing composition capable of suppressing roll-off also has been proposed that includes an abrasive such as colloidal silica and a water-soluble polymer in which at least one of a carboxylic acid group, a salt of the carboxylic acid group, a sulfonic acid group, and a salt of the sulfonic acid group is bonded to the main chain (Patent Document 2).

PRIOR ART DOCUMENTS

Patent Documents

Patent Document 1: JP 2007-191696 A
Patent Document 2: JP 2009-50920 A

DISCLOSURE OF INVENTION

Problem to be Solved by the Invention

To lower the flying height of the magnetic head, it is important to reduce waviness as well as roughness of the disk surface.

However, when the polishing compositions disclosed in Patent Document 1 and Patent Document 2 are used to polish an aluminosilicate-containing substrate to be polished, the waviness of the polished surface of the substrate cannot be effectively reduced.

Therefore, the present invention provides a method for manufacturing an aluminosilicate glass substrate for a hard disk, in which an aluminosilicate-containing substrate to be polished is used, and waviness of the polished surface of the substrate can be reduced, and a method for reducing surface waviness of an aluminosilicate glass substrate for a hard disk.

Means for Solving Problem

A method for manufacturing an aluminosilicate glass substrate for a hard disk of the present invention includes polishing an aluminosilicate glass substrate to be polished with a polishing composition that includes silica particles, a polymer having a sulfonic acid group, and water, wherein an adsorption constant of the polymer having the sulfonic acid group on aluminosilicate glass is 1.5 to 5.0 L/g.

A method for reducing surface waviness of an aluminosilicate glass substrate for a hard disk of the present invention includes polishing an aluminosilicate glass substrate to be polished with a polishing composition that includes silica particles, a polymer having a sulfonic acid group, and water, wherein an adsorption constant of the polymer having the sulfonic acid group on aluminosilicate glass is 1.5 to 5.0 L/g.

Effects of the Invention

The present invention can provide a method for manufacturing an aluminosilicate glass substrate for a hard disk, in which waviness of the polished surface of the substrate can be reduced, and a method for reducing surface waviness of an aluminosilicate glass substrate for a hard disk.

DESCRIPTION OF THE INVENTION

In the present invention, the "waviness" means the unevenness of the surface of a substrate and has a longer wavelength than the roughness. The waviness generally includes long-wavelength waviness (with a wavelength of 0.5 to 2 mm), short-wavelength waviness (with a wavelength of 50 to 160 μm), and middle-wavelength waviness (with a wavelength of 160 to 500 μm). In the present specification, the waviness indicates the middle-wavelength waviness unless otherwise noted. By reducing the waviness of the polished surface of the substrate, the flying height of the magnetic head can be lowered, and thus the recording density of the magnetic disk substrate can be improved.

The method for manufacturing an aluminosilicate glass substrate for a hard disk of the present invention (also referred to as a "manufacturing method of the present invention" in the following) uses a polishing composition for an aluminosilicate glass substrate (also referred to as a "polishing composition" in the following) to polish an aluminosilicate glass substrate to be polished (also referred to as an "aluminosilicate glass substrate", a "glass substrate", a "substrate to be polished", or a "substrate" in the following). As the constituent elements of the aluminosilicate glass substrate, except for O, Si is present in the largest amount, followed by Al and Na. In general, the Si content is 20 to 40 wt %, the Al content is 3 to 25 wt %, and the Na content is 3 to 25 wt %. When the aluminosilicate glass substrate is used as a hard disk substrate, the Al content is preferably 3 wt % or more, more preferably 5 wt % or more, and even more preferably 7 wt % or more in terms of improving the adsorption of the polymer having the sulfonic acid group on the aluminosilicate glass substrate and improving the alkali resistance of the substrate. Moreover, the Al content is preferably 25 wt % or less, more preferably 20 wt % or less, and even more preferably 15 wt % or less in terms of maintaining the transparency of the substrate. Therefore, the Al content is preferably 3 to 25 wt %, more preferably 5 to 20 wt %, and even more preferably 7 to 15 wt %. In terms of improving the alkali resistance of the substrate and maintaining the transparency of the substrate, the Na content is preferably 3 to 25 wt %, more preferably 3 to 20 wt %, and even more preferably 5 to 15 wt %. The measurement conditions of the contents of Si, Al, and Na in the aluminosilicate glass substrate will be described in detail in Examples.

Si and Al are present as oxides such as $SiO_2$ and $Al_2O_3$ in the aluminosilicate glass substrate. The aluminosilicate glass substrate used in the manufacturing method of the present invention includes, e.g., at least one component selected from the group consisting of $Na_2O$, $K_2O$, $B_2O_3$, CaO, $ZrO_2$, and $TiO_2$ in addition to $SiO_2$ and $Al_2O_3$. Among these components other than $Al_2O_3$, the polymer having the sulfonic acid group also can be adsorbed on the components that carry positive charges in an acid solution. Therefore, the presence of such components is expected to improve the effect of reducing the waviness, as will be described later.

[Silica Particle]

The polishing composition used in the manufacturing method of the present invention includes silica particles. The silica particles used for the polishing composition may be colloidal silica particles, fumed silica particles, surface-modified silica particles, or the like. In terms of reducing the waviness, the colloidal silica particles are preferred. Moreover, it is preferable that the silica particles are used in the form of a slurry The colloidal silica particles can be obtained, e.g., by a water glass process or an alkoxysilane process. In the water glass process, alkali metal silicate such as sodium silicate is used as a raw material, and this material is subjected to a condensation reaction in an aqueous solution to grow particles. In the alkoxysilane process, alkoxysilane such as tetraethoxysilane is used as a raw material, and this material is subjected to a condensation reaction in water containing a water-soluble organic solvent such as alcohol to grow particles. The fumed silica particles can be obtained, e.g., by a vapor phase process in which a volatile silicon compound such as silicon tetrachloride is used as a raw material, and this material is hydrolyzed at a high temperature of 1000° C. or more with an oxygen-hydrogen burner to grow particles.

In terms of improving the polishing rate, reducing the waviness, and improving the surface smoothness, the average particles size of the silica particles is preferably 5 to 200 nm, more preferably 7 to 100 nm, even more preferably 10 to 80 nm, and further preferably 15 to 50 nm.

The average particle size of the silica particles can be determined by the following method. A sample is observed with a transmission electron microscope (TEM) "JEM-2000FX" (trade name, 80 kV, 10000-50000X, manufactured by JEOL Ltd.) in accordance with the manufacturer's instruction manual, and TEM images are photographed. These pictures are scanned into a personal computer as image data using a scanner. Then, the diameter of a circle having the same area as the projected area of each of the silica particles is determined with analysis software "WinROOF Ver. 3.6" (available from Mitani Corporation) and identified as a particle size. In this manner, the particles sizes of 1000 or more silica particles are obtained. Subsequently, the average of those particle sizes is calculated.

With the silica particles included in the polishing composition, a value is obtained by dividing the area of a circle whose diameter is equal to the maximum diameter of each of the silica particles that has been measured by the transmission electron microscope (TEM) observation by the projected area of this silica particle and multiplying the result by 100 (see Japanese Patent No. 3253228, the value is referred to as "SF1" in the following), and then the average of those values is calculated. The resultant average is preferably 100 to 140, more preferably 100 to 135, and even more preferably 100 to 130. The waviness of the surface of the aluminosilicate glass substrate can be further reduced by controlling SF1 within the above range. The particle shape is closer to a sphere as SF1 is closer to 100.

With the silica particles included in the polishing composition, a value is obtained by dividing the area of a circle whose circumference is equal to the perimeter of each of the silica particles that has been measured by the transmission electron microscope (TEM) observation by the projected area of this silica particle and multiplying the result by 100 (see Japanese Patent No. 3253228, the value is referred to as "SF2" in the following), and then the average of those values is calculated. The resultant average is preferably 100 to 130, more preferably 100 to 125, even more preferably 100 to 120, further preferably 100 to 115, and still further preferably 100 to 110. The waviness of the surface of the aluminosilicate glass substrate can be further reduced by controlling SF2 within the above range. The particle surface is smoother as SF2 is closer to 100.

SF1 can be obtained, e.g., by the following method. A sample is observed with a transmission electron microscope "JEM-2000FX" (80 kV, 10000-15000X) manufactured by JEOL Ltd. in accordance with the manufacturer's instruction manual, and TEM images are photographed. These pictures are scanned into a personal computer as image data using a scanner. Then, the maximum diameter and the projected area of a single particle are determined with analysis software "WinROOF Ver. 3.6" (available from Mitani Corporation) to calculate SF1. SF2 can be obtained from the perimeter and the projected area of a signal particle that are determined in the similar manner to SF1.

In terms of improving the polishing rate and reducing the surface roughness, the content of the silica particles in the polishing composition is preferably 1 to 20 wt %, more preferably 2 to 19 wt %, even more preferably 3 to 18 wt %, and further preferably 5 to 16 wt % of the polishing composition.

[Polymer having Sulfonic Acid Group]

The polishing composition includes a polymer having a sulfonic acid group, in which an adsorption constant of the polymer having the sulfonic acid group on aluminosilicate glass is 1.5 to 5.0 L/g. The polymer having the sulfonic acid group (also referred to as a "polymer" in the following) contributes to a reduction in waviness and the formation of a surface with high flatness when the polishing composition is used to polish the aluminosilicate glass substrate. In the present specification, the use of the polymer includes the use of the polymer and/or its salt.

The reason for the reduction in waviness is assumed as follows. When the polishing composition is supplied to the polishing surface, the polymer having the sulfonic acid group dissociates in the polishing composition, and therefore carries a negative charge. On the other hand, $Al_2O_3$ included in the aluminosilicate glass substrate carries a positive charge. Accordingly, the polymer having the sulfonic acid group is adsorbed on the surface of the aluminosilicate glass substrate (particularly on a site in which the component that carries a positive charge in an acid solution is present, e.g., the $Al_2O_3$ site of the substrate surface) via the sulfonic acid group, thereby forming a coating.

If the adsorption strength of the polymer having the sulfonic acid group on the aluminosilicate glass is appropriate, a load that is higher than the set load of a polishing apparatus is applied to the protrusions of the substrate surface, so that the coating is likely to be broken, and the polishing proceeds easily. On the other hand, the load applied to the recesses of the substrate surface is lower than that applied to the protrusions of the substrate surface. Therefore, the recesses are protected by the coating and not likely to be polished. Thus, since the protrusions are selectively polished, differences in level between the protrusions and the recesses become smaller, and the planarization of the polishing surface proceeds.

If the adsorption strength of the polymer having the sulfonic acid group on the aluminosilicate glass is high, the coating is not likely to be broken in both the protrusions and the recesses of the substrate surface, making it difficult to polish both the protrusions and the recesses. Thus, the polishing surface is not easily flattened.

The adsorption strength can be expressed by the above adsorption constant. The adsorption strength of the polymer having the sulfonic acid group on the aluminosilicate glass increases as the "adsorption constant" increases. Moreover, the adsorption strength of the polymer having the sulfonic acid group on the aluminosilicate glass decreases as the "adsorption constant" decreases.

Using the polishing composition, the polymer having the sulfonic acid group forms a coating that is adsorbed on the polishing surface with proper strength because the adsorption constant of the polymer having the sulfonic acid group on the aluminosilicate glass is 1.5 to 5.0 L/g. Thus, the waviness of the substrate surface can be reduced, resulting in a surface with excellent flatness. However, the present invention is not limited to the above assumptions.

In the present invention, the adsorption constant of the polymer having the sulfonic acid group on the aluminosilicate glass is determined by the measurement method as described in Examples and calculated by the following formula (1).

[Formula 1]

$$\frac{c}{A} = \frac{1}{KA_m} + \frac{c}{A_m} \quad (1)$$

where K represents the adsorption constant, A represents the adsorption amount of the polymer on the aluminosilicate glass, $A_m$ represents the saturated adsorption amount of the polymer on the aluminosilicate glass, and c represents the concentration of the polymer that has not been adsorbed on the aluminosilicate glass. The measurement conditions of a test for measuring the adsorption constant of the polymer on the aluminosilicate glass will be described in detail in Examples.

The formula (1) can be derived from the Langmuir adsorption isotherm. The polymer having the sulfonic acid group, as will be described later, is in a stable dissociation state even with an acidic pH level. Therefore, it is assumed that the polymer having the sulfonic acid group is adsorbed, e.g., on the alumina ($Al_2O_3$) site of the aluminosilicate glass substrate that carries a positive charge by Langmuir-type adsorption (monolayer adsorption).

In terms of reducing the waviness of the substrate surface further, the adsorption constant is preferably 1.5 to 4.0 L/g, more preferably 1.6 to 3.5 L/g, even more preferably 1.6 to 3.3 L/g, further preferably 1.8 to 3.0 L/g, still further preferably 1.8 to 2.5 L/g, and particularly preferably 1.8 to 2.4 L/g.

The polymer having the sulfonic acid group used in the present invention is not particularly limited as long as the adsorption constant is 1.5 to 5.0 L/g. However, a polymer having an aromatic ring such as a benzene ring or a naphthalene ring is preferred, and a polymer having a naphthalene ring is more preferred because the polymer can be adsorbed on the aluminosilicate glass substrate with more proper strength.

When the polymer having the aromatic ring is adsorbed on the aluminosilicate glass substrate, a $\pi$-$\pi$ interaction occurs between the polymers so that the polymers are stacked and stabilized. Therefore, it is assumed that a coating having more proper strength can be formed.

The weight average molecular weight of the polymer having the sulfonic acid group is preferably 3000 to 100000, more preferably 3200 to 50000, even more preferably 3300 to 30000, and further preferably 3400 to 20000 because the polymer can be adsorbed on the aluminosilicate glass substrate with more proper strength. The weight average molecular weight is measured by a gel permeation chromatography (GPC) under the measurement conditions, as will be described in detail in Examples.

Examples of a monomer having a sulfonic acid group include a monomer having an aromatic ring (a benzene ring, a naphthalene ring, etc.) such as styrenesulfonic acid or naphthalenesulfonic acid, isoprenesulfonic acid, (meth)acrylamide-2-methylpropanesulfonic acid, methallylsulfonic acid, vinylsufonic acid, allylsulfonic acid, and isoamylenesulfonic acid. Among them, the monomer having the aromatic ring (the benzene ring, the naphthalene ring, etc.) such as styrenesulfonic acid or naphthalenesulfonic acid is preferred, the styrenesulfonic acid and the naphthalenesulfonic acid are more preferred, and the naphthalenesulfonic acid is even more preferred because the polymer can be adsorbed on the aluminosilicate glass substrate with proper strength. These monomers having the sulfonic acid group may be used individually or in combinations of two or more.

The polymer having the sulfonic acid group may be either a homopolymer of a monomer component having a sulfonic acid group or a copolymer of monomer components including other monomers. The other monomers that can be used for the synthesis of the polymer having the sulfonic acid group are preferably hydrophobic monomers in terms of improving the adsorption of the polymer on the aluminosilicate glass substrate. In the present invention, the hydrophobic monomers have a solubility of 2 g or less in 100 g of water at 20° C. The solubility of the hydrophobic monomers in 100 g of water at 20° C. is preferably 0 to 1 g, and more preferably 0 to 0.1 g in terms of improving the adsorption of the polymer on the aluminosilicate glass substrate.

Specific examples of the hydrophobic monomers preferably include the following: an alkyl acrylate monomer; an alkyl methacrylate monomer; a polyalkylene glycol acrylate monomer except for a polyethylene glycol acrylate monomer; a polyalkylene glycol methacrylate monomer except for a polyethylene glycol methacrylate monomer; a styrene monomer; an alkyl acrylamide monomer; and an alkyl methacrylamide monomer. Among them, the alkyl acrylate monomer, the alkyl methacrylate monomer, and the styrene monomer are preferred, and the styrene monomer is more preferred because the polymer having the sulfonic acid group can be adsorbed on the aluminosilicate glass substrate with proper strength. These hydrophobic monomers may be used individually or in combinations of two or more.

Examples of the alkyl acrylate monomer and the alkyl methacrylate monomer include the following: methyl methacrylate; ethyl methacrylate; butyl methacrylate; hexyl methacrylate; octyl methacrylate; ethylhexyl methacrylate; decyl methacrylate; lauryl methacrylate (LMA); palmityl methacrylate; cetyl methacrylate; stearyl methacrylate (SMA); isostearyl methacrylate (ISMA); behenyl methacrylate (BMA); phenyl methacrylate; benzyl methacrylate (BzMA); cyclohexyl methacrylate; methyl acrylate; ethyl acrylate; butyl acrylate; hexyl acrylate; octyl acrylate; ethylhexyl acrylate; decyl acrylate; lauryl acrylate; palmityl acrylate; cetyl acrylate; stearyl acrylate; isostearyl acrylate; behenyl acrylate; phenyl acrylate; benzyl acrylate; and cyclohexyl acrylate. Among them, the methyl methacrylate and the ethyl methacrylate are preferred, and the methyl methacrylate is more preferred because the polymer having the sulfonic acid group can be adsorbed on the aluminosilicate glass substrate with proper strength.

Examples of the styrene monomer include the following: styrene; α-methylstyrene; 2-methylstyrene; 3-methylstyrene; 4-methylstyrene; α,2-dimethylstyrene; 2,4-dimethylstyrene; 2,5-dimethylstyrene; 2,4,6-trimethylstyrene; 2-ethylstyrene; 4-ethylstyrene; 4-isopropylstyrene; 2-methoxystyrene; 3-methoxystyrene; 4-methoxystyrene; 4-ethoxystyrene; 4-phenoxystyrene; 4-phenylstyrene; 2-hydroxystyrene; and 4-hydroxystyrene. Among them, the styrene is preferred because the polymer having the sulfonic acid group can be adsorbed on the aluminosilicate glass substrate with proper strength.

In terms of forming a coating with proper adsorption strength on the aluminosilicate glass substrate, the proportion of the monomer having the sulfonic acid group in the monomers corresponding to the constitutional unit of the copolymer is preferably 10 mol % or more, and more preferably 20 mol % or more.

In terms of improving the workability of mixing, the polymer having the sulfonic acid group is preferably in water-soluble form and may be, e.g., in the form of a salt. Examples of the salt include alkali metal salts such as sodium and potassium, and ammonium salts such as ammonium and alkylammonium. Among them, the alkali metal salts such as sodium and potassium are preferred, and the sodium salt is more preferred.

Specific examples of the polymer having the sulfonic acid group include the following: β-naphthalenesulfonic acid formalin condensate; butylnaphthalenesulfonic acid-naphthalenesulfonic acid formalin co-condensate; styrene-styrenesulfonic acid copolymer; polystyrene sulfonic acid; polynaphthalene sulfonic acid; polybutyl naphthalene sulfonic acid; polyhydroxy naphthalene sulfonic acid; polymethyl naphthalene sulfonic acid; polyethyl naphthalene sulfonic acid; polyisoprene sulfonic acid; poly(meth) acrylamide-2-methylpropane sulfonic acid; polymethallyl sulfonic acid; polyvinyl sulfonic acid; polyallyl sulfonic acid; polyisoamylene sulfonic acid; and salts thereof. For the reason that the polymer having the sulfonic acid group can be adsorbed on the aluminosilicate glass substrate with proper strength, the polymer having the sulfonic acid group is preferably the polymer having the aromatic ring such as a benzene ring or a naphthalene ring, more preferably at least one type of polymer selected from the group consisting of β-naphthalenesulfonic acid formalin condensate, butylnaphthalenesulfonic acid-naphthalenesulfonic acid formalin co-condensate, polystyrene sulfonic acid, styrene-styrenesulfonic acid copolymer, polynaphthalene sulfonic acid, polybutyl naphthalene sulfonic acid, polyhydroxy naphthalene sulfonic acid, polymethyl naphthalene sulfonic acid, polyethyl naphthalene sulfonic acid, and salts thereof, even more preferably at least one type of polymer selected from the group consisting of styrene-styrenesulfonic acid copolymer, β-naphthalenesulfonic acid formalin condensate, butylnaphthalenesulfonic acid-naphthalenesulfonic acid formalin co-condensate, polynaphthalene sulfonic acid, polybutyl naphthalene sulfonic acid, polyhydroxy naphthalene sulfonic acid, polymethyl naphthalene sulfonic acid, polyethyl naphthalene sulfonic acid, polyethyl naphthalene sulfonic acid, and salts thereof, further preferably at least one type of polymer selected from the group consisting of styrene-styrenesulfonic acid copolymer, β-naphthalenesulfonic acid formalin condensate, butylnaphthalenesulfonic acid-naphthalenesulfonic acid formalin co-condensate, and salts thereof, and still further preferably β-naphthalenesulfonic acid formalin condensate and a salt thereof.

The polymer having the sulfonic acid group can be obtained by the sulfonation of a base polymer including a diene structure or an aromatic structure with a known method as described, e.g., in New Experimental Chemistry Course 14 (Synthesis and Reaction of Organic Compounds III, page 1773, 1978) edited by the Chemical Society of Japan.

In terms of reducing the waviness effectively, the adsorption ratio of the polymer having the sulfonic acid group on a silica particle surface (as will be described later) is preferably 0 to 20%, more preferably 0 to 10%, even more preferably 0 to 5%, further preferably 0 to 1%, still further preferably 0 to 0.5%, and particularly preferably 0%. In other words, it is preferable that the polymer having the sulfonic acid group does not substantially act on the silica particles, and is adsorbed solely on the polishing surface to form a coating. The adsorption ratio indicates the proportion of the amount of the polymer having the sulfonic acid group adsorbed on the silica particles to the amount of the polymer having the sulfonic acid group added. The measurement conditions will be described in detail in Examples.

In terms of reducing the waviness effectively, the content of the polymer having the sulfonic acid group in the polishing composition is preferably 0.0001 wt % or more, more preferably 0.0005 wt % or more, even more preferably 0.001 wt % or more, and further preferably 0.005 wt % or more. In terms of improving the productivity of the substrate, the content of the polymer having the sulfonic acid group in the polishing composition is preferably 5 wt % or less, more preferably 4 wt % or less, even more preferably 3 wt % or less, further preferably 1 wt % or less, still further preferably 0.2 wt % or less, and particularly preferably 0.05 wt % or less. That is, the content of the polymer having the sulfonic acid group in the polishing composition is preferably 0.0001 to 5 wt %, more preferably 0.0005 to 4 wt %, even more preferably 0.001 to 3 wt %, further preferably 0.005 to 1 wt %, still further preferably 0.005 to 0.2 wt %, and particularly preferably 0.005 to 0.05 wt %.

[Water]

The water included in the polishing composition is used as a medium and may be, e.g., distilled water, ion-exchanged water, pure water, or ultrapure water. The content of the water in the polishing composition is preferably 55 wt % or more, more preferably 70 wt % or more, even more preferably 80 wt % or more, and particularly preferably 85 wt % or more because the polishing composition is more easily handled. Moreover, the content of the water in the polishing composition is preferably 99 wt % or less, more preferably 98 wt % or less, and even more preferably 97 wt % or less in terms of improving the polishing rate. Therefore, the content of the water in the polishing composition is preferably 55 to 99 wt %, more preferably 70 to 98 wt %, even more preferably 80 to 97 wt %, and further preferably 85 to 97 wt %.

[pH of Polishing Composition]

The pH of the polishing composition is preferably 0.8 or more, more preferably 1.0 or more, and even more preferably 1.2 or more because the aluminosilicate glass substrate is easily cleaned, the corrosion of a processing machine can be prevented, and workers can work more safely. Moreover, the pH of the polishing composition is preferably 5 or less, more preferably 4.5 or less, even more preferably 4.0 or less, and further preferably 3.5 or less in terms of improving the polishing rate and reducing the waviness. Therefore, the pH of the polishing composition is preferably 0.8 to 5, more preferably 1.0 to 4.5, even more preferably 1.2 to 4.0, and further preferably 1.2 to 3.5.

[Acid]

The pH of the polishing composition can be adjusted, e.g., by the content of an acid. In the present specification, the use of the acid includes the use of the acid and/or its salt. The acid may be an inorganic acid or an organic acid. Examples of the inorganic acid include hydrochloric acid, nitric acid, sulfuric acid, phosphoric acid, polyphosphoric acid, and amidosulfonic acid. Examples of the organic acid include carboxylic acid, organic phosphoric acid, and amino acid. Examples of the carboxylic acid include monovalent carboxylic acid such as acetic acid, glycolic acid, ascorbic acid, or gluconic acid, divalent carboxylic acid such as oxalic acid, tartaric acid, maleic acid, or malic acid, and trivalent carboxylic acid such as citric acid. Examples of the organic phosphoric acid include 2-aminoethyl phosphonic acid, 1-hydroxyethylidene-1,1-diphosphonic acid (HEDP), aminotri(methylene phosphonic acid), ethylenediaminetetra(methylene phosphonic acid), and diethylenetriaminepenta(methylene phosphonic acid). Examples of the amino acid include glycine and alanine. Among them, in terms of reducing the waviness, the inorganic acid, the carboxylic acid, and the organic phosphoric acid are preferred and, e.g., the hydrochloric acid, the nitric acid, the sulfuric acid, the phosphoric acid, the polyphosphoric acid, the glycolic acid, the oxalic acid, the citric acid, the HEDP, the aminotri(methylene phosphonic acid), the ethylenediaminetetra(methylene phosphonic acid), and the diethylenetriaminepenta(methylene phosphonic acid) are suitable. These acids for adjusting the pH may be used individually or in combinations of two or more. However, in terms of improving the polishing rate, a mixture of the inorganic acid and the organic phosphoric acid is preferred. In terms of improving the stability of the pH of the polishing liquid and maintaining a high polishing rate in circular polishing, it is preferable to use a mixture of the carboxylic acid and the organic phosphoric acid, or the divalent or trivalent carboxylic acid, more preferable to use the trivalent carboxylic acid, and even more preferable to use he citric acid.

The content of the acid in the polishing composition is preferably 0.05 wt % or more, more preferably 0.1 wt % or more, and even more preferably 0.2 wt % or more in terms of improving the polishing rate. Moreover, the content of the acid in the polishing composition is preferably 10 wt % or less, more preferably 7.5 wt % or less, and even more preferably 5 wt % or less so as to suppress the corrosion of a polishing apparatus. Therefore, the content of the acid in the polishing composition is preferably 0.05 to 10 wt %, more preferably 0.1 to 7.5 wt %, and even more preferably 0.2 to 5 wt %.

[Other Component]

The polishing composition may further include a bactericidal agent, an antimicrobial agent, a thickening agent, a dispersing agent, an anticorrosive agent, etc.

In view of the polishing characteristics, the content of these components in the polishing composition is preferably 5 wt % or less, more preferably 3 wt % or less, and even more preferably 1 wt % or less.

[Method for Preparing Polishing Composition]

The polishing composition can be prepared by mixing the components with a known method. To achieve the cost effectiveness, in many cases, the polishing composition is generally produced as a concentrated solution, and the concentrated solution is diluted at the time of use. The polishing composition may be used as it is or may be diluted if it is in the form of a concentrated solution. When the concentrated solution is diluted, the dilution ratio is not particularly limited, and can be appropriately determined in accordance with the concentration of each component (e.g., the content of an abrasive) in the concentrated solution, the polishing conditions, or the like.

The pH of the polishing composition may be adjusted to a predetermined value after mixing the above components. Alternatively, the pH of each of the above components may be adjusted prior to the mixing so that the polishing composition has a desired pH by mixing the components. The pH adjustment can be performed with the above acids and/or a pH adjuster.

[Method for Manufacturing Aluminosilicate Glass Substrate for Hard Disk]

The method for manufacturing an aluminosilicate glass substrate for a hard disk of the present invention includes polishing an aluminosilicate glass substrate to be polished with the polishing composition.

The aluminosilicate glass substrate for a hard disk can be manufactured in the following manner. For example, an aluminosilicate glass base material is obtained by pressing molten glass into a mold or by being cut from a sheet glass. Subsequently, the aluminosilicate glass base material is subjected to a rough grinding process, a fine grinding process, a shape machining process, an end-face mirror finishing process, a polishing process, a chemical strengthening process, etc. In some cases, the chemical strengthening process is performed before the polishing process. Moreover, a cleaning process can be performed between each of the processes. Then, the aluminosilicate glass substrate undergoes a recording portion forming process in a method for manufacturing a magnetic disk, thereby providing a magnetic disk. The recording portion forming process includes, e.g., forming a seed layer, an underlayer, an intermediate layer, a magnetic layer, a protective layer, and a lubricating layer on the aluminosilicate glass substrate.

The rough grinding process uses alumina abrasive grains of about #400, the shape machining process uses a cylindrical grindstone, the end-face mirror finishing process uses a brush, and the fine grinding process uses alumina abrasive grains of about #1000.

The polishing process is divided into, e.g., a first polishing process and a second polishing process. Although the first polishing process and the second polishing process are performed in this order, the polishing process often also includes, e.g., a final (finish) polishing process to improve the surface quality. The first polishing process preferably uses cerium oxide particles as abrasive grains, and the final (finish) polishing process preferably uses silica particles as abrasive grains. It is preferable that the polishing composition is used in the second polishing process and/or the final (finish) polishing process.

After each of the second polishing process and the final (finish) polishing process, ultrasonic cleaning is performed in a washing tank containing an alkaline cleaner; a neutral cleaner; or an acid cleaner to dissolve and remove abrasive grains and swarf that remain on the surface of the aluminosilicate glass substrate. Subsequently, the manufacturing method of the present invention may include a cleaning process in which the aluminosilicate glass substrate is cleaned with pure water or IPA, and a drying process in which the aluminosilicate glass substrate is dried by IPA (steam drying) or spin drying. A scrub treatment may be performed during the cleaning process.

The aluminosilicate glass substrate for a hard disk is required to have a smooth surface that does not cause a read/write error of the magnetic head. That is, the substrate surface should have high flatness (i.e., low roughness, waviness, etc.) and less defects (i.e., protrusions and recesses such as scratches and pits due to the abrasive grains or the like). In the manufacturing process of the aluminosilicate glass substrate for a hard disk, the polishing process serves to improve the flatness of the substrate surface and to eliminate the defects. Therefore, the second polishing process or the final (finish) polishing process is particularly important in the polishing process.

The polishing process can be performed, e.g., by supplying the polishing composition to the polishing surface of the substrate to be polished, bringing a polishing pad into contact with the polishing surface, and then moving the polishing pad or the substrate to be polished while applying a predetermined pressure (load). For more information on the specific polishing method in the polishing process, reference can be made to a method for polishing an aluminosilicate glass substrate, as will be described later. The above polishing can be performed with a conventionally known polishing apparatus.

[Method for Polishing Aluminosilicate Glass Substrate]

The polishing apparatus used in a method for polishing an aluminosilicate glass substrate (i.e., the substrate to be polished) with the polishing composition (also referred to as a "polishing method" in the following) is not particularly limited, and can be a polishing apparatus that includes a jig (i.e., a carrier made of aramid or the like) for holding the substrate to be polished and a polishing cloth (polishing pad). In particular, a double-sided polishing apparatus is suitably used.

The material for the polishing pad is, e.g., an organic polymer such as polyurethane. The polishing pad is preferably in the form of a nonwoven fabric. For example, a suede-type hard urethane pad is preferably used in the first polishing process, and a suede-type flexible urethane pad is preferably used in the second polishing process and the final polishing process.

In the specific example of the polishing method using the polishing apparatus, the substrate to be polished is held by the carrier and sandwiched between a pair of polishing surface plates to which the polishing pads are attached. The polishing composition is supplied between each of the polishing pads and the substrate to be polished, and the polishing surface plates and/or the substrate to be polished are moved under a predetermined pressure. Thus, the substrate to be polished is polished while the polishing composition is brought into contact with the substrate to be polished.

The above polishing method preferably includes polishing the substrate to be polished at a predetermined polishing pressure with the polishing composition interposed between each of the polishing pads and the substrate to be polished. The "polishing pressure" means the pressure that is applied from the surface plates sandwiching the substrate to be polished to the polishing surfaces of the substrate to be polished during polishing. The polishing pressure can be easily adjusted by a general polishing apparatus, e.g., by means of air pressure or weight applied to the surface plates or the substrate to be polished. In terms of improving the polishing rate, reducing the waviness efficiently, and providing the surface with high smoothness, the polishing pressure is 3 kPa or more, preferably 4 kPa or more, more preferably 5 kPa or more, and even more preferably 6 kPa or more. In terms of reducing the waviness and providing the surface with high smoothness, the polishing pressure is 40 kPa or less, preferably 30 kPa or less, more preferably 20 kPa or less, and even more preferably 15 kPa or less. Therefore, in terms of improving the polishing rate and the surface smoothness, the polishing pressure is 3 to 40 kPa, preferably 4 to 30 kPa, more preferably 5 to 20 kPa, and even more preferably 6 to 15 kPa. The polishing pressure can be adjusted by controlling air pressure or weight applied to the surface plates or the substrate to be polished.

The above polishing method is preferably used in the second polishing process and the subsequent process of the polishing process, and more preferably used in the final (finish) polishing process.

The polishing composition can be supplied in the following manner. For example, the components of the polishing composition are sufficiently mixed beforehand, and then supplied between the polishing pad and the glass substrate with a pump or the like. The components of the polishing composition may be mixed in a supply line or the like, and then supplied. Alternatively, a slurry of the silica particles and an aqueous solution in which the polymer having the sulfonic acid group is dissolved may be separately supplied to the polishing apparatus.

In terms of reducing the cost, the supply rate of the polishing composition is preferably 1.0 mL/min or less, more preferably 0.6 mL/min or less, and even more preferably 0.4 mL/min or less per 1 $cm^2$ of the substrate to be polished. Moreover, the supply rate is preferably 0.01 mL/min or more, more preferably 0.025 mL/min or more, and even more preferably 0.05 mL/min or more per 1 $cm^2$ of the glass substrate because the polishing rate can be improved further. Therefore, the supply rate is preferably 0.01 to 10 mL/min, more preferably 0.025 to 0.6 mL/min, and even more preferably 0.05 to 0.4 mL/min per 1 $cm^2$ of the glass substrate.

The polishing composition also can be used in circular polishing that recycles the used polishing composition. Since the polishing composition has excellent circulation durability, it is preferable that the polishing composition is used with a polishing apparatus including a mechanism for circulating and recycling the polishing composition. It is more preferable that the polishing composition is used in the second polishing process and/or the final (finish) polishing process with the polishing apparatus including the mechanism for circulating and recycling the polishing composition. In the circular polishing, compounds such as acids and additives that are consumed by polishing may be added as needed.

In the case of the circular polishing of the substrate to be polished, the supply rate of the polishing composition is preferably 0.1 mL or more, more preferably 0.2 mL/min or more, and even more preferably 0.5 mL/min or more per 1 $cm^2$ of the substrate to be polished because the polishing rate can be improved further. Although the upper limit of the supply rate is not particularly limited, in terms of reducing the cost, the supply rate is preferably 3.0 mL/min or less, more preferably 2.5 mL/min or less, and even more preferably 2.0 mL/min or less per 1 $cm^2$ of the substrate to be polished. Therefore, the supply rate is preferably 0.1 to 3.0 mL/min, more preferably 0.2 to 2.5 mL/min, and even more preferably 0.5 to 2.0 mL/min per 1 $cm^2$ of the substrate to be polished.

The above method for polishing an aluminosilicate glass substrate can reduce the waviness of the glass substrate, and thus can provide the surface with high smoothness. Therefore, when the polishing method is used in the method for manufacturing an aluminosilicate glass substrate for a hard disk to reduce the surface waviness of the aluminosilicate glass substrate, the waviness can be effectively reduced in the polishing process of the aluminosilicate glass substrate.

EXAMPLES

Examples 1 to 4 and Comparative Examples 1 to 12

1. Preparation of Substrate to be Polished

Table 2 shows details of the substrate to be polished. In Table 2, Wa (arithmetic average waviness) of the middle-wavelength (160 to 500 μm) was measured by New View 5032 (manufactured by Zygo Corporation).

(1) Aluminosilicate Glass Substrate

An aluminosilicate glass substrate that had been roughly polished with the polishing composition containing ceria abrasive grains was prepared as a substrate to be polished. The Al content, the Si content, and the Na content of the substrate were 8.6 wt %, 27.1 wt %, and 6.0 wt %, respectively. These values were measured by an ESCA method under the following measurement conditions.

[ESCA Measurement Condition]

Sample Preparation

The aluminosilicate glass substrate was cut into 1 cm×1 cm, and this aluminosilicate glass substrate piece was fixed on a double-sided carbon adhesive tape. To remove dust or the like from the surface of the aluminosilicate glass substrate piece, Ar sputtering was performed at an acceleration voltage of 2 kV for 6 minutes, and then an ESCA measurement was performed.

Measurement

Equipment: PHI Quantera SXM manufactured by ULVAC-PHI Inc.

X-ray source: monochromatic Al K α radiation, 1486.6 eV, 25 W, 15 kV

Beam diameter: 100 μm

X-ray incident angle: 45°

Measuring range: 500×500 μm$^2$

Pass energy: 280.0 (survey), 140.0 eV (narrow)

Step size: 1.00 (survey), 0.250 eV (narrow)

Measuring element: C, N, O, Na, Mg, Al, Si, S, K, Ti, Zr, Nb

Electrification correction: Neutralizer and Ar$^+$ irradiation (2) Ni—P plated aluminum alloy substrate A Ni—P plated aluminum alloy substrate that had been roughly polished with the polishing composition containing an alumina abrasive was prepared as a substrate to be polished.

(3) Silicate Glass Substrate

A silicate glass substrate composed of pure $SiO_2$, to which $Al_2O_3$ or the like was not added, was prepared as a substrate to be polished.

2. Preparation of Polishing Composition

For Examples 1, 2, and 4 and Comparative Examples 1 to 12, polishing compositions were prepared in the following manner. A sulfuric acid and HEDP were added to ion-exchanged water, and then each of the following polymers (1) to (11) was added. Moreover, colloidal silica particles (average particle size: 25 nm, SF1 (average): 123, and SF2 (average): 109) were added as silica particles, and the pH was adjusted to 1.5. The amount of each of the components added with respect to the total weight of the polishing composition was as follows: 0.35 wt % of the sulfuric acid; 0.13 wt % of the BEDP; 0.01 wt % of the polymers (1) to (11); and 9 wt % of the colloidal silica particles. For Example 3, a polishing composition was prepared in the same manner as Example 2 except that a citric acid was added instead of the sulfuric acid and the HEDP, and the pH was adjusted to 2.5. The amount of each of the components added with respect to the total weight of the polishing composition was as follows: 1.5 wt % of the citric acid; 0.01 wt % of the polymer (2); and 9 wt % of the colloidal silica particles.

The polymers (1) to (11) used are described in detail below.

(1) β-naphthalenesulfonic acid formalin condensate sodium salt (manufactured by Kao Corporation)

(2) Butylnaphthalenesulfonic acid-naphthalenesulfonic acid formalin co-condensate sodium salt (molar ratio in co-condensation: 20/80, manufactured by Kao Corporation)

(3) Styrene-styrenesulfonic acid copolymer (molar ratio in co-condensation: 18/82, manufactured by Kao Corporation)

(4) Acrylic acid-acrylamide-2-methylpropanesulfonic acid copolymer sodium salt (molar ratio in copolymerization: 89/11, manufactured by TOAGOSEI CO., LID.)

(5) β-naphthalenesulfonic acid formalin condensate sodium salt (manufactured by Kao Corporation)

(6) Polyvinyl sulfonic acid sodium salt (manufactured by Sigma-Aldrich Co., LLC.)

(7) Polystyrene sulfonic acid sodium salt (PS-1 manufactured by TOSOH CORPORATION)

(8) Sulfonic acid copolymer (A-6021 manufactured by TOAGOSEI CO., LTD.)

(9) Carboxylic acid copolymer ammonium salt (poise: 2100, manufactured by Kao Corporation)

(10) Polyacrylic acid (A-10SL manufactured by TOAGOSEI CO., LTD.)

(11) Sulfonic acid copolymer (A-6020 manufactured by TOAGOSEI CO., LTD.)

3. Measurement Method

The adsorption constant of the polymer on the aluminosilicate glass, the adsorption ratio of the polymer on the silica particles (colloidal silica particles), the weight average molecular weight of the polymer, the pH of the polishing composition, the average particle size of the silica particles, SF1 and SF2 of the silica particles, and the waviness were measured in the following manner.

<Method for Measuring Adsorption Constant of Polymer on Aluminosilicate Glass>

Each of the polymers (1) to (11) was added to ion-exchanged water to have a concentration of 0 to 5000 ppm. Then, a hydrochloric acid was added to 20 g (25° C.) of the aqueous solution thus obtained so that the pH was adjusted to 1.5. The aluminosilicate glass substrate was pulverized into aluminosilicate glass particles with a particle size of about 5 μm, and 0.5 g of the aluminosilicate glass particles were added to the aqueous solution, stirred, and subjected to centrifugal separation at 3500 rpm for 15 minutes using a centrifuge (H-28F manufactured by KOKUSAN Co., Ltd.). Next, the aluminosilicate glass particles were allowed to settle out, and the concentration of the carbon in a supernatant fluid was measured by TOC-500 manufactured by Shimadzu Corporation. The measured carbon concentration and a calibration curve prepared with the polymer of a known concentration were used to calculate the concentration c of the polymer in the supernatant fluid. Subsequently, the adsorption amount A of the polymer was determined by subtracting the concentration c from the concentration of the polymer added. The amount of the polymer added and the adsorption amount A of the polymer on the aluminosilicate glass particles were plotted on a graph, and the adsorption constant K at 25° C. was calculated by the following formula (1).

[Formula 2]

$$\frac{c}{A} = \frac{1}{KA_m} + \frac{c}{A_m} \quad (1)$$

Based on the formula (1), the measurement results were plotted on a graph with the x-axis indicating c and the y-axis indicating c/A, so that the saturated adsorption amount $A_m$ was calculated from the slope $1/A_m$ and the adsorption constant K was calculated from the y-intercept $1/KA_m$.

<Method for Measuring Adsorption Ratio of Polymer on Silica Particle>

The concentration of the polymer that was not adsorbed on the silica particles was determined in the similar manner to the measurement method of the adsorption constant except that the colloidal silica particles were used instead of the aluminosilicate glass particles, and the concentration of each of the polymers (1) to (11) was set to 100 ppm. The concentration of the polymer that was adsorbed on the silica particles was determined by subtracting the concentration of the polymer that was not adsorbed on the silica particles from the concentration of the polymer added (100 ppm). Then, the concentration thus obtained was divided by the concentration of the polymer added, which was multiplied by 100. The resultant value was defined as the adsorption ratio of the polymer on the silica particles.

<Method for Measuring Weight Average Molecular Weight>

Each of the polymers (1) to (11) was dissolved in chloroform, and the weight-average molecular weight was measured by a gel permeation chromatography (GPC) under the following conditions.

<GPC Condition>
Column: G4000 SWXL+G2000 SWXL
Eluant 30 mM CH3COONa/CH3CN=6/4 (pH=6.9)
Flow rate: 1.0 mL/min
Column temperature: 40° C.
Detection: RI
Reference material: polystyrene (Mw 8420000, 96400, A-500 (manufactured by TOSOH CORPORATION), Mw 30000, 4000 (manufactured by Nishio-KK), Mw 900000 (manufactured by Chemco Scientific Co., Ltd.))

<pH Measurement Condition>

The pH of the polishing composition (25° C.) was measured by a pH meter (glass-type hydrogen ion concentration index meter "HM-30G" manufactured by DKK-TOA CORPORATION).

<Method for Measuring Average Particle Size of Silica Particle>

A sample including colloidal silica particles was observed with a transmission electron microscope "JEM-2000FX" (80 kV, 10000-50000X, manufactured by JEOL Ltd.) in accordance with the manufacturer's instruction manual, and TEM (transmission electron microscope) images were photographed. These pictures were scanned into a personal computer as image data using a scanner. Then, the diameter of a circle having the same area as the projected area of each of the silica particles was determined with analysis software "Win-ROOF Ver. 3.6" (available from Mitani Corporation) and identified as a particle size. In this manner, the particles sizes of 1000 silica particles were obtained. Subsequently, the average of those particle sizes was calculated, and this average was defined as an average particle size.

<Method for Measuring SF1 and SF2 of Silica Particle>

The TEM images of a sample including colloidal silica particles were photographed in the same manner as the measurement method of the average particle size, and these pictures were scanned into a personal computer as image data using a scanner. Then, the maximum diameter and the projected area of a single particle were determined with the same analysis software to calculate SF1. In this manner, the SF1 values of 100 silica particles were obtained. Subsequently, the average of those SF1 values was calculated. SF2 was calculated by measuring the parameter and the projected area of a single particle with the same analysis software. In this manner, the SF2 values of 100 silica particles were obtained. Subsequently, the average of those SF2 values was calculated.

<Method for Evaluating Waviness>

When the aluminosilicate glass substrate and the Ni—P plated aluminum alloy substrate were the substrates to be polished, four substrates were selected as desired from 10 substrates that were polished by the polishing method as described below, and the waviness of each of the four substrates was measured under the following conditions. Then, the average of the measured values of the waviness of the four substrates was calculated as middle-wavelength waviness of the substrate. Table 1 shows the results of the waviness as relative values with respect to the waviness of the substrates polished with the polishing compositions of Comparative Examples 1, 9, which is defined as 100. When the silicate glass substrate was the substrate to be polished, the waviness of a substrate that was polished by the polishing method as described below was measured under the following conditions. Table 1 shows the results of the waviness as relative values with respect to the waviness of the substrate polished with the polishing composition of Comparative Example 11, which is defined as 100.

Measuring device: New View 5032 (manufacture by Zygo Corporation)
Lens: 2.5×
Zoom: 0.5×
Measuring wavelength: 160 to 500 μm (middle-wavelength waviness)
Measuring position: In the case of the aluminosilicate glass substrate and the Ni—P plated aluminum alloy substrate, a portion at a radius of 25 mm from the substrate center was measured; in the case of the silicate glass substrate, a portion at a radius of 10 mm from the substrate center was measured.
Analysis software: Zygo Metro Pro (manufactured by Zygo Corporation)

4. Polishing Method

Polishing was performed with each of the polishing compositions of Examples 1 to 4 and Comparative Examples 1 to 12 under the following conditions of a standard polishing test.

[Polishing Condition]

(1) Polishing Condition of Aluminosilicate Glass Substrate
Polishing test machine: "9B Double Side Polisher" manufactured by Speedfam Co., Ltd.
Polishing pad: suede type (thickness: 0.9 mm, average pore diameter: 30 μm)
Supply of polishing composition: 100 mL/min (supply rate per 1 cm² of the substrate to be polished: about 0.3 mL/min)
Number of revolutions of lower surface plate: 32.5 rpm
Polishing pressure: 8.4 kPa
Carrier: made of aramid and having a thickness of 0.45 mm
Polishing amount: The target amount of polishing for one side was 2.5 μm.

Substrate to be polished: aluminosilicate glass substrate (outer diameter: 65 mm, inner diameter: 20 mm, thickness: 0.635 mm, middle-wavelength waviness before polishing: 3.0 Å)
Number of substrates inserted: 10
Rinse condition: pressure=2.0 kPa, time=2 min, supply of ion-exchanged water=about 2 L/min
Dressing condition: Brush dressing was performed for 2 minutes every time the polishing was performed while supplying ion-exchanged water.

(2) Polishing condition of Ni—P plated aluminum alloy substrate

Polishing test machine: "9B Double Side Polisher" manufactured by Speedfam Co., Ltd.
Polishing pad: suede type (thickness: 0.9 mm, average pore diameter: 30 μm)
Supply of polishing composition: 100 mL/min (supply rate per 1 cm$^2$ of the substrate to be polished: about 0.14 mL/min)
Number of revolutions of lower surface plate: 32.5 rpm
Polishing pressure: 8.4 kPa
Carrier: made of aramid and having a thickness of 1.0 mm
Polishing amount: The target amount of polishing for one side was 2.5 μm.
Substrate to be polished: Ni—P plated aluminum alloy substrate (outer diameter: 95 mm, inner diameter: 25 mm, thickness: 1.27 mm, middle-wavelength waviness before polishing: 2.8 Å)
Number of substrates inserted: 10
Rinse condition: pressure=2.0 kPa, time=2 min, supply of ion-exchanged water=about 2 L/min
Dressing condition: Brush dressing was performed for 2 minutes every time the polishing was performed while supplying ion-exchanged water.

Additive: 0.4% hydrogen peroxide solution was added to the polishing liquid as an additive.

(3) Polishing Condition of Silicate Glass Substrate

Polishing test machine: "Single Side Polisher MA-300" manufactured by Engis Japan Corporation
Polishing pad: suede type (thickness: 0.9 mm, average pore diameter: 30 μm)
Supply of polishing composition: 10 mL/min (supply rate per 1 cm$^2$ of the substrate to be polished: about 0.3 mL/min)
Number of revolutions of lower surface plate: 54 rpm (the relative velocity of the pad with respect to the substrate was equal to that of the polishing conditions of the aluminosilicate glass substrate)
Polishing pressure: 8.4 kPa
Carrier: made of aramid and having a thickness of 0.8 mm
Polishing amount: The target amount of polishing for one side was 2.5 μm.
Substrate to be polished: silicate glass substrate (outer diameter: 50 mm, thickness: 1.0 mm, middle-wavelength waviness before polishing: 4.1 Å)
Number of substrates inserted: 1
Rinse condition: pressure=2.0 kPa, time=2 min, supply of ion-exchanged water=about 2 L/min
Dressing condition: Brush dressing was performed for 2 minutes every time the polishing was performed while supplying ion-exchanged water.

As shown in Table 1, when the polishing composition that includes the polymer having the sulfonic acid group, in which the adsorption constant of the polymer on the aluminosilicate glass is 1.5 to 5.0 L/g, was used for polishing, the waviness of the polished surface of the substrate was effectively reduced. Moreover, when the three types of substrates to be polished were polished with the polishing composition that includes the polymer having the sulfonic acid group with an adsorption constant of 1.5 to 5.0 L/g, the waviness of only the aluminosilicate glass substrate was effectively reduced.

TABLE 1

| | | Compound | Adsorption constant K [L/g] | Weight average molecular weight [g/mol] | Substrate to be polished | Adsorption ratio of polymer on colloidal silica [%] | Waviness [Relative value] |
|---|---|---|---|---|---|---|---|
| Ex. 1 | (1) | β-naphthalenesulfonic acid formalin condensate sodium salt | 2.4 | 14,000 | AS glass substrate [X-1] | 0.0 | 84 |
| Ex. 2 | (2) | Butylnaphthalenesulfonic acid-naphthalenesulfonic acid formalin co-condensate sodium salt | 2.0 | 3,500 | AS glass substrate [X-1] | 0.5 | 86 |
| Ex. 3 | (2) | Butylnaphthalenesulfonic acid-naphthalenesulfonic acid formalin co-condensate sodium salt | 2.0 | 3,500 | AS glass substrate [X-1] | 0.5 | 88 |
| Ex. 4 | (3) | Styrene-styrenesulfonic acid copolymer | 1.8 | 7,400 | AS glass substrate [X-1] | 0.3 | 87 |
| Com. Ex. 1 | (4) | Acrylic acid-acrylamide-2-methylpropanesulfonic acid copolymer sodium salt | 1.2 | 2,000 | AS glass substrate [X-1] | 0.0 | 100 |
| Com. Ex. 2 | (5) | β-naphthalenesulfonic acid formalin condensate sodium salt | 5.3 | 1,400 | AS glass substrate [X-1] | 0.6 | 100 |
| Com. Ex. 3 | (6) | Polyvinyl sulfonic acid sodium salt | 0.5 | 6,000 | AS glass substrate [X-1] | 0.0 | 99 |
| Com. Ex. 4 | (7) | Polystyrene sulfonic acid sodium salt | 1.4 | 10,000 | AS glass substrate [X-1] | 0.6 | 100 |
| Com. Ex. 5 | (8) | Sulfonic acid copolymer | 0.6 | 100,000 | AS glass substrate [X-1] | 1.1 | 105 |
| Com. Ex. 6 | (9) | Carboxylic acid copolymer ammonium salt | 0.5 | 50,000 | AS glass substrate [X-1] | 0.9 | 98 |
| Com. Ex. 7 | (10) | Polyacrylic acid | 0.8 | 6,000 | AS glass substrate [X-1] | 0.5 | 103 |
| Com. | (11) | Sulfonic acid copolymer | 0.9 | 10,000 | AS glass | 0.1 | 97 |

TABLE 1-continued

| | | Compound | Adsorption constant K [L/g] | Weight average molecular weight [g/mol] | Substrate to be polished | Adsorption ratio of polymer on colloidal silica [%] | Waviness [Relative value] |
|---|---|---|---|---|---|---|---|
| Ex. 8 | | | | | substrate X1 | | |
| Com. Ex. 9 | (4) | Acrylic acid-acrylamide-2-methylpropanesulfonic acid copolymer sodium salt | 1.2 | 2,000 | Ni—P plated substrate X2 | 0.0 | 100 |
| Com. Ex. 10 | (1) | β-naphthalenesulfonic acid formalin condensate sodium salt | 2.4 | 14,000 | Ni—P plated substrate X2 | 0.0 | 99 |
| Com. Ex. 11 | — | None | — | — | Silicate glass substrate | — | 100 |
| Com. Ex. 12 | (1) | β-naphthalenesulfonic acid formalin condensate sodium salt | 2.4 | 14,000 | Silicate glass substrate | 0.0 | 99 |

X1 Aluminosilicate glass substrate
X2 Ni—P plated aluminum alloy substrate

TABLE 2

| Substrate to be polished | Thickness [mm] | Inner diameter [mm] | Outer diameter [mm] | Wa of middle-wavelength [Å] |
|---|---|---|---|---|
| Aluminosilicate glass substrate | 0.635 | 20 | 65 | 3.0 |
| Ni—P plated aluminum alloy substrate | 1.27 | 25 | 95 | 2.8 |
| Silicate glass substrate | 1 | — | 50 | 4.1 |

INDUSTRIAL APPLICABILITY

According to the method for manufacturing an aluminosilicate glass substrate for a hard disk by using the polishing composition of the present invention, and the method for reducing surface waviness of an aluminosilicate glass substrate for a hard disk of the present invention, the waviness can be effectively reduced in the polishing process of the aluminosilicate glass substrate to be polished. Therefore, the present invention is useful for the manufacture of the aluminosilicate glass substrate, and particularly useful for the manufacture of the aluminosilicate glass substrate for a hard disk.

The invention claimed is:

1. A method for manufacturing an aluminosilicate glass substrate for a hard disk comprising:
    polishing an aluminosilicate glass substrate to be polished with a polishing composition that comprises silica particles, a polymer having a naphthalene ring and a sulfonic acid group, and water, wherein an adsorption constant of the polymer having the naphthalene and the sulfonic acid group on aluminosilicate glass is 1.5 to 5.0 L/g.

2. The method for manufacturing an aluminosilicate glass substrate for a hard disk according to claim 1, wherein a weight average molecular weight of the polymer having the sulfonic acid group is 3000 to 100000.

3. The method for manufacturing an aluminosilicate glass substrate for a hard disk according to claim 1, wherein a content of Al in the aluminosilicate glass substrate to be polished is 3 to 25 wt %.

4. The method for manufacturing an aluminosilicate glass substrate for a hard disk according to claim 1, wherein a content of Na in the aluminosilicate glass substrate to be polished is 3 to 25 wt %.

5. The method for manufacturing an aluminosilicate glass substrate for a hard disk according to claim 1, wherein the polishing composition further comprises a trivalent carboxylic acid.

6. The method for manufacturing an aluminosilicate glass substrate for a hard disk according to claim 5, wherein a content of the trivalent carboxylic acid in the polishing composition is 0.05 to 10 wt %.

7. The method for manufacturing an aluminosilicate glass substrate for a hard disk according to claim 1, wherein the polishing composition has a pH of 0.8 to 5.

8. The method for manufacturing an aluminosilicate glass substrate for a hard disk according to claim 1, wherein the silica particles are colloidal silica particles.

9. The method for manufacturing an aluminosilicate glass substrate for a hard disk according to claim 1, wherein the silica particles have an average particle size of 5 to 200 nm.

10. The method for manufacturing an aluminosilicate glass substrate for a hard disk according to claim 1, wherein a content of the polymer having the naphthalene and the sulfonic acid group in the polishing composition is 0.0001 to 5 wt %.

11. The method for manufacturing an aluminosilicate glass substrate for a hard disk according to claim 1, wherein a content of the silica particles in the polishing composition is 1 to 20 wt %.

12. A method for reducing surface waviness of an aluminosilicate glass substrate for a hard disk comprising:
    polishing an aluminosilicate glass substrate to be polished with a polishing composition that comprises silica particles, a polymer having a naphthalene ring and a sulfonic acid group, and water, wherein an adsorption constant of the polymer having the naphthalene ring and the sulfonic acid group on aluminosilicate glass is 1.5 to 5.0 L/g.

13. The method for manufacturing an aluminosilicate glass substrate for a hard disk according to claim 1, wherein the polymer having the naphthalene ring and the sulfonic acid group is β-naphthalenesulfonic acid, formaldehyde condensate and a salt thereof.

* * * * *